(12) United States Patent
Gao

(10) Patent No.: US 8,452,180 B2
(45) Date of Patent: May 28, 2013

(54) OPTICAL MULTIPLEXER

(76) Inventor: Peiliang Gao, Alviso, CA (US)

( * ) Notice: Subject to any disclaimer, the term of this patent is extended or adjusted under 35 U.S.C. 154(b) by 571 days.

(21) Appl. No.: 12/436,103

(22) Filed: May 5, 2009

(65) Prior Publication Data

US 2010/0284696 A1    Nov. 11, 2010

(51) Int. Cl.
*H04J 14/02* (2006.01)
(52) U.S. Cl.
USPC .............................................. 398/85; 398/83
(58) Field of Classification Search
USPC .................................... 398/83, 85, 43, 79, 82
See application file for complete search history.

(56) References Cited

U.S. PATENT DOCUMENTS

| | | | |
|---|---|---|---|
| 3,656,068 A | 4/1972 | Runge | |
| 3,944,334 A | 3/1976 | Yano et al. | |
| 4,250,466 A | 2/1981 | Jernigan | |
| 4,720,177 A | 1/1988 | Chang | |
| 4,841,528 A | 6/1989 | Sipes | |
| 5,329,397 A | 7/1994 | Chang | |
| 5,361,155 A | 11/1994 | Chiaroni et al. | |
| 5,446,813 A | 8/1995 | Lee et al. | |
| 6,560,382 B1 | 5/2003 | Lasher et al. | |
| 6,563,845 B2 | 5/2003 | Kumkar | |
| 6,707,959 B2 | 3/2004 | Duceliler et al. | |
| 6,714,743 B2 | 3/2004 | Hsieh et al. | |
| 6,728,041 B2 | 4/2004 | Chang et al. | |
| 6,822,785 B1 | 11/2004 | Chu et al. | |
| 6,845,195 B2 * | 1/2005 | Tedesco | 385/37 |
| 6,847,757 B2 | 1/2005 | Chang et al. | |
| 6,944,363 B2 | 9/2005 | Li et al. | |
| 7,027,684 B2 | 4/2006 | Ducellier et al. | |
| 7,057,799 B2 | 6/2006 | Chu | |
| 7,130,319 B1 | 10/2006 | Kaneda | |
| 7,313,298 B2 | 12/2007 | Xia et al. | |
| 7,433,557 B2 | 10/2008 | Chen et al. | |
| 2006/0203340 A1 | 9/2006 | Hesline | |
| 2009/0067773 A1 | 3/2009 | Krug | |
| 2009/0180776 A1 | 7/2009 | Broksky | |

FOREIGN PATENT DOCUMENTS

| | | |
|---|---|---|
| CN | 2505867 Y | 8/2002 |
| CN | 1996073 | 7/2007 |
| CN | 101141221 | 3/2008 |
| CN | 101246239 | 8/2008 |

(Continued)

OTHER PUBLICATIONS

A.P. Goutzoulis and D.R. Pape, "Design and Fabrication of Acousto-optic Devices", Marcel Dekker, Inc. (New York, 1994).

(Continued)

*Primary Examiner* — Jack Dinh
(74) *Attorney, Agent, or Firm* — IPxLaw Group LLP

(57) ABSTRACT

A scalable reconfigurable (or tunable) optical add/drop multiplexer (SROADM) is disclosed. The SROADM includes a pair of acoustic optic tunable filters (AOTF) and a wavelength blocker (WB). A first input port receives an initial wavelength division multiplexer (WDM) optical signal including to-be-dropped optical signal(s). A second input port(s) receives optical signal(s) to be added, which has the same wavelength(s) as that optical signal(s) to be dropped. In one embodiment, the WB is connected to the AOTFs through free space coupling. In another embodiment, the coupling is achieved by optical fiber fusion splicing. The latter method has advantage of using commercially available products and easier assembly while a more compact size is achievable by the free space coupling. The device is scalable in terms of number of add/drop ports and capacity to process any number of wavelength channels.

28 Claims, 26 Drawing Sheets

FOREIGN PATENT DOCUMENTS

| | | |
|---|---|---|
| CN | 101630814 | 1/2010 |
| CN | 10162988 | 3/2010 |
| CN | 101672954 | 3/2010 |
| CN | 101672986 | 3/2010 |
| CN | 101673921 | 3/2010 |
| WO | WO2007064238 A1 | 6/2007 |
| WO | PCT/CN2010/072617 | 3/2011 |
| WO | PCT/CN2010/072608 | 10/2011 |
| WO | PCT/CN2010/072624 | 10/2011 |

OTHER PUBLICATIONS

Adrian Korpel, "Acousto-Optics" Marcel Dekker, Inc. (New York, 1997).
ISR for PCT/CN2010/072617.
ISR for PCT/CN2010/072624.
ISR for PCT/CN2010/072608.

* cited by examiner

FIG. 14  Long-pass filter

FIG. 15  band-pass filter

FIG. 16   band-reject filter

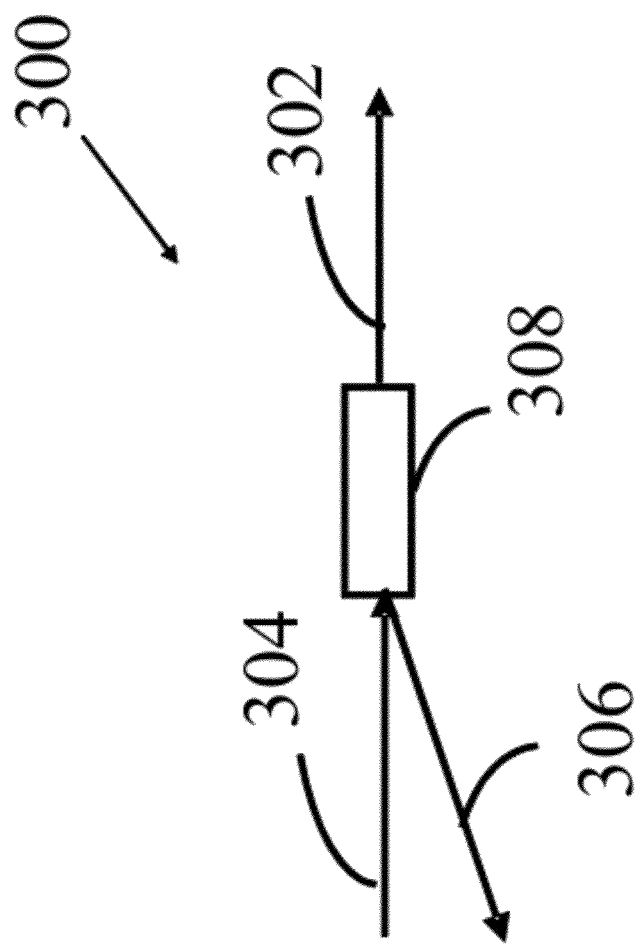
FIG. 19-1    3-port demultiplexer

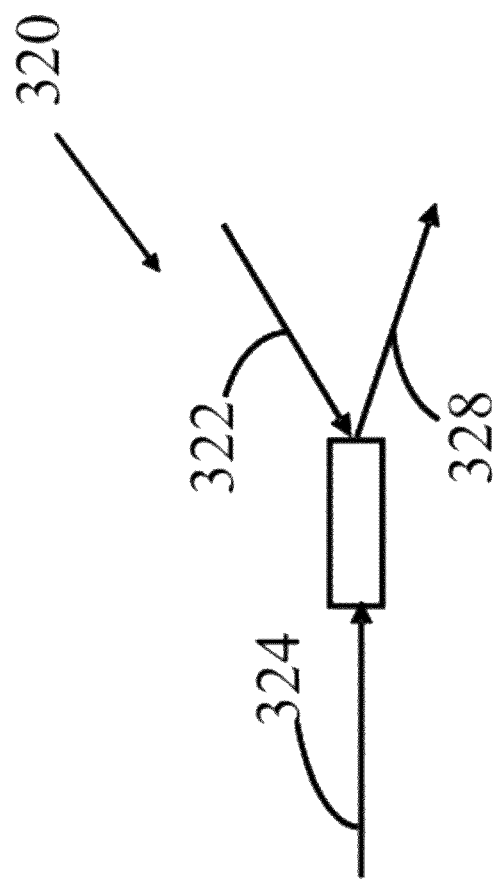
FIG. 19-2  3-port multiplexer

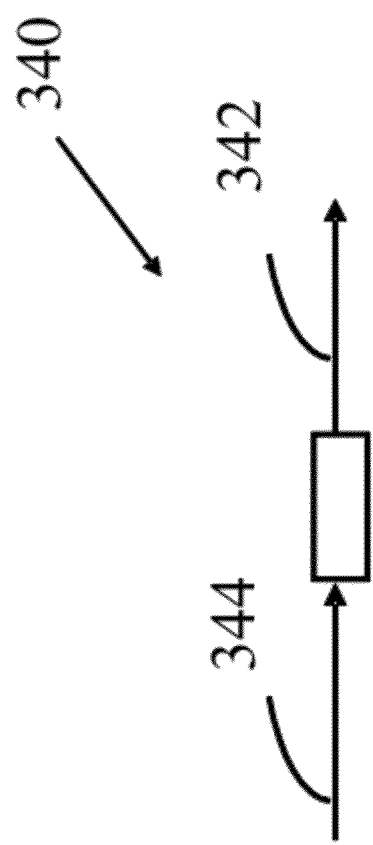
FIG. 19-3    VOA/Shuttle

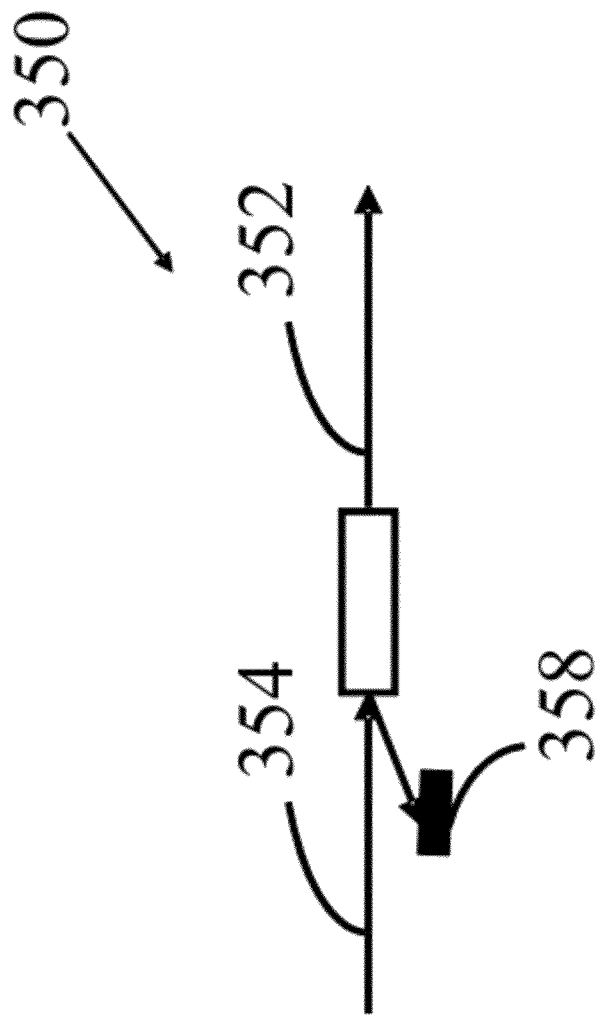
FIG. 19-4  1~5% TAP

OPTICAL MULTIPLEXER

FIELD OF INVENTION

The present invention relates generally to the method and apparatus for providing agile optical signal wavelength routing in optical fiber telecommunication network system. More specifically, the technology described herein relates to systems and methods for a high-speed Reconfigurable Optical Add/Drop Multiplexer (ROADM). Furthermore, this invention relates to the use of acousto-optic tunable filter and the fixed multilayer-dielectric-optical-thin-film-filter-based wavelength blocker to achieve fast wavelength add/drop multiplexing without mechanically moving parts.

BACKGROUND

Optical communication networks often employ a technique, known as wavelength division multiplexing (WDM), to increase the amount of information that can be transmitted via the network. In WDM, multiple signals are transmitted through a communications path at distinct optical wavelengths. Each wavelength is intensity modulated by a different electrical signal and an optical multiplexer combines the modulated light beams into the communications path. At the receiver, an optical demultiplexer separates the different wavelengths and directs them to different detectors.

WDM systems are classified as either coarse or dense, depending on the number of channels and the channel spacing. Coarse WDM (CWDM) systems use a few channels with widely spaced wavelengths (20 nm or more). Dense WDM (DWDM) systems have a large number of channels (more than 8) with closely spaced wavelengths. Spacings of 0.2, 0.4 up to 1.6 nm are common. DWDM is used at higher levels in the communications hierarchy, but presents difficult design challenges.

An optical add-drop multiplexer (OADM) is an important routing device used in communication networks. In such a device, a demultiplexer sorts wavelength components, separates and drops one of the wavelength components, adds a new wavelength component, and combines all of the wavelength components back into a single beam using a multiplexer.

BRIEF DESCRIPTION OF DRAWINGS

These and other features, aspects and advantages of the present invention will become better understood with regard to the following description, appended claims, and accompanying drawings where:

FIG. 6-1 shows Bragg diffraction by an acousto-optic crystal filter (AOTF) used for reconfigurable optical "drop" multiplexer;

FIG. 6-2 is a block diagram of an acousto-optic tunable filter (AOTF) used for reconfigurable optical "drop" multiplexer;

FIG. 7-1 shows Bragg diffraction by an acousto-optic crystal filter (AOTF) used for reconfigurable optical "add" multiplexer;

FIG. 7-2 is a block diagram of an acousto-optic tunable filter (AOTF) used for reconfigurable optical "add" multiplexer;

FIG. 11-1 is a block diagram of an optical wavelength demultiplexer;

FIG. 11-2 is a block diagram of an optical wavelength multiplexer;

FIG. 19-1 shows a 3-port fiber pigtailed optical WDM device based on band-pass thin film filters for a typical demultiplexing application;

FIG. 19-2 shows a 3-port fiber pigtailed optical WDM device based on band-pass thin film filters for a typical multiplexing application;

FIG. 19-3 shows a 2-port fiber pigtailed optical VOA device;

FIG. 19-4 shows a 3-port fiber pigtailed optical TAP device;

SUMMARY OF INVENTION

Figure 1:
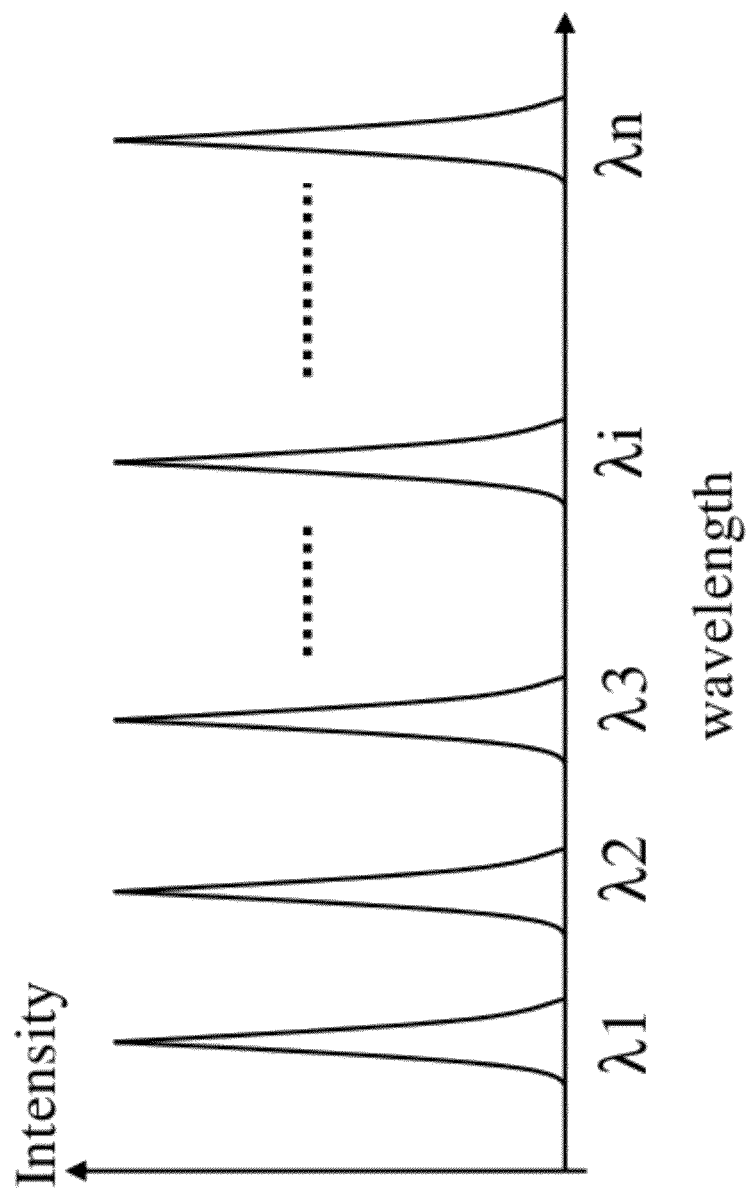
FIG. 1 shows a multi-wavelength optical signal with equal wavelength separation gap and approximately same power.

The present invention aims to provide a new method and apparatus for routing or switching optical wavelengths such as is used for channel routing applications in an agile WDM optical communication network. By utilizing Acousto-optical tunable filter (AOTF), add and drop functionality, from and to one or a number of ports, can be implemented with fast response and execution time. It is an objective to make a ROADM with sub-millisecond wavelength switching time.

The fact that AOTF is transparent to all input wavelengths not meeting the Bragg diffraction conditions makes it possible to use multiple AOTFs in series, and makes all add ports and drop ports colorless, i.e., each add/drop port can be tuned to add/drop any single wavelength or a band of wavelengths. It is therefore another objective to make a ROADM scalable in terms of the number of add/drop ports and make add/drop port capable of adding/dropping any wavelength within the defined spectrum range, i.e. all add/drop ports are colorless.

Because, in Bragg diffraction, the zeroth order contains all input wavelengths, a wavelength blocker is necessary to block the dropped wavelength from passing to the next network node. In one embodiment, the wavelength blocker comprises multilayer dielectric thin film filters and the coupling between AOTFs and wavelength blocker is in free space. An advantage of free space coupling is the reduced device size.

One embodiment of the present invention is an optical multiplexer that includes a first acousto-optical tunable filter, a waveblocker and a second acousto-optical tunable filter. The first acousto-optical tunable filter receives an input multiple wavelength signal on an input port and transmits said signal to an output port, and is tunable to transmit a selected one of the wavelengths in the multiple wavelength signal to a drop port. The wavelength blocker has an input port connected to the output port of the acousto-optical tunable filter to receive the multiple wavelength signal, and is operable to block the selected wavelength and transmit the remaining wavelengths to an output port of the wavelength blocker. The second acousto-optical tunable filter has an input port that receives the remaining wavelengths, and an add port and is tunable to add a wavelength present on the add port to the remaining wavelengths to form, on an output port, an output signal of the multiplexer.

In one embodiment, the wavelength blocker includes a first sequence of filters that separates the multiple-wavelength input signal into its constituent wavelengths, a set of optical switches, where each switch is connected to one of the filters in the first set of filters and is selectively operable to block one or more of the constituent wavelengths, a second sequence of filters that combines the constituent wavelengths passed by the optical switches into a wavelength blocker output signal.

In another embodiment, the wavelength blocker includes a first sequence of filters that separates the multiple-wavelength signal into its constituent wavelengths, a set of variable optical attenuators, where each attenuator is connected to one of the filters in the first set of filters and being selectively operable to attenuate one or more of the constituent wavelengths, and a second sequence of filters that combines the constituent wavelengths passed by the optical switches into a wavelength blocker output signal.

In another embodiment, both wavelength blocker and AOTF are fiber pigtailed, and the coupling between AOTFs and wavelength blocker is by fusion splicing the optical fibers from each single device. Although the device increases in size, it has the advantage of using commercially available products and simplifying manufacturing processes.

It is yet another objective to make low cost ROADMs in high volume.

Because it is important in the optical network that each wavelength channel has approximately the same power, it is desirable to have a ROADM with an integrated optical power equalizer.

In the preferred embodiments, such power equalization functionality can be readily added to the wavelength blocker both in free space configuration and in fiber pigtailed structure by inserting a beam splitter or a 3-port tap device with about a 1%–~5% tap ratio to each wavelength channel respectively.

It is also an objective to build a ROADM with integrated power equalization function for all channels.

DETAILED DESCRIPTION

The scalable reconfigurable optical add/drop multiplexer in accordance with the preferred embodiments of the invention is described herein with reference to the accompanying drawings, wherein the same reference numbers denote the same elements. Exemplary references to an optical wavelength, or simply a channel should be understood to mean an optical signal with a center wavelength and certain bandwidth.

FIG. 1 shows a typical multi-wavelength optical signal with equal channel spacing. Channel spacing is measured from the center of one channel to the center of an adjacent channel.

The reconfiguration functions of a ROADM can be achieved using a variety of technologies including tunable filters technology, microelectromechanical systems (MEMS) http://en.wikipedia.org/wiki/MEMS, liquid crystal, thermo-optic and beam-steering switches in planar waveguide circuits, and technologies based on parallel wavelength filtering, either free-space embodiments using bulk diffraction gratings or waveguide embodiments using AWG (Arrayed Waveguide Gratings).

While each of the above-mentioned technology has its merits and drawbacks, an AOTF-based ROADM and wavelength selective switch has some competitive advantages in performance, cost, scalability and manufacturability, and therefore provides a viable alternative solution in manipulating the wavelength for applications in optical telecommunication. The present invention described herein solves this problem by utilizing a wavelength blocker, blocking one or more dropped wavelengths while passing the remaining wavelength channels.

The Reconfigurable Optical Add Drop Multiplexer

Figure 2:
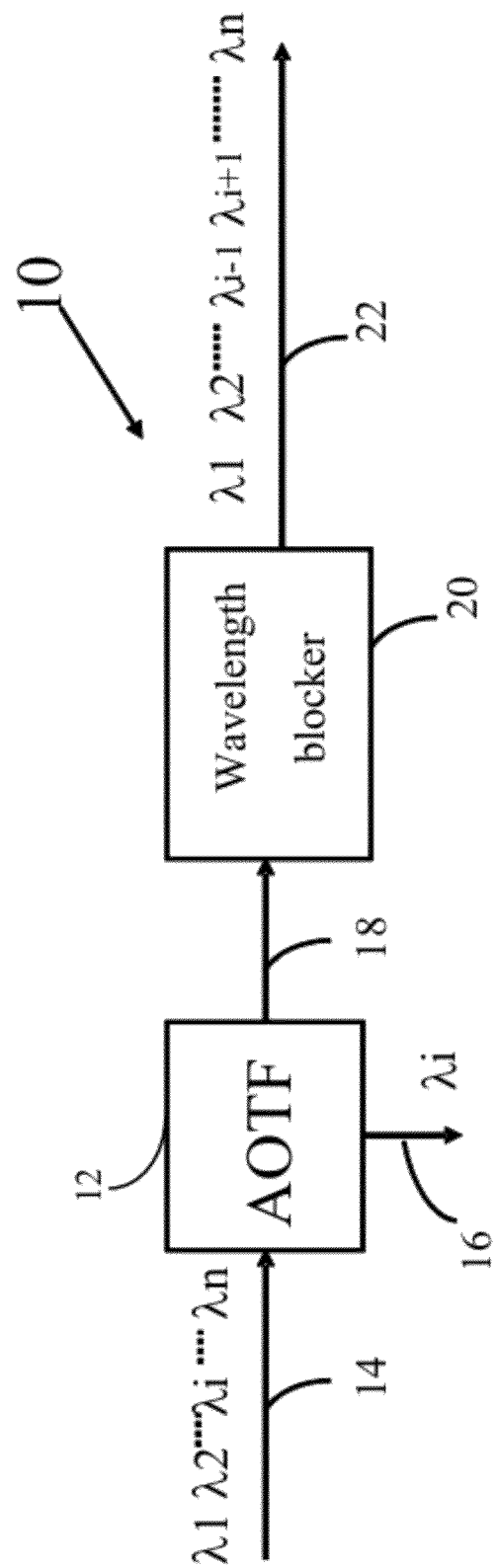
FIG. 2 is a block diagram of a reconfigurable optical "drop" multiplexer comprising an AOTF and a wavelength blocker.
Figure 8:
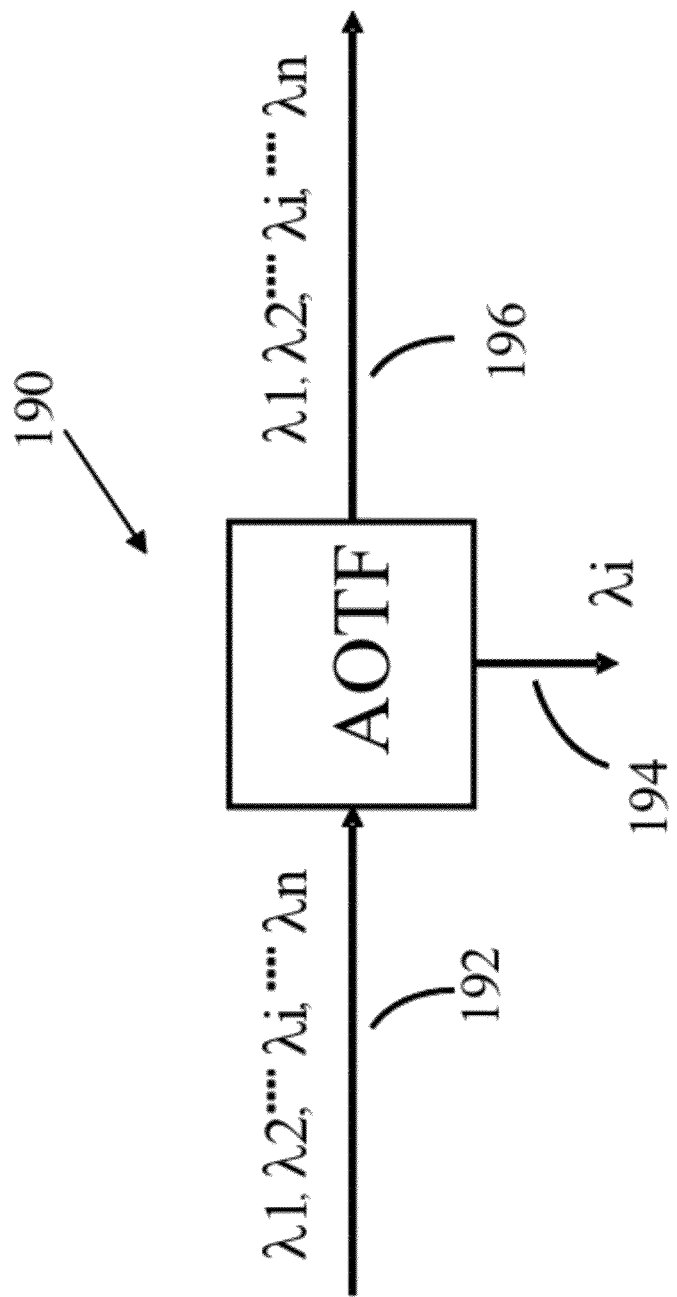
FIG. 8 shows a multi-wavelength signal input to a reconfigurable optical "drop" multiplexer, the dropped wavelength and the passed wavelengths.
Figure 10:
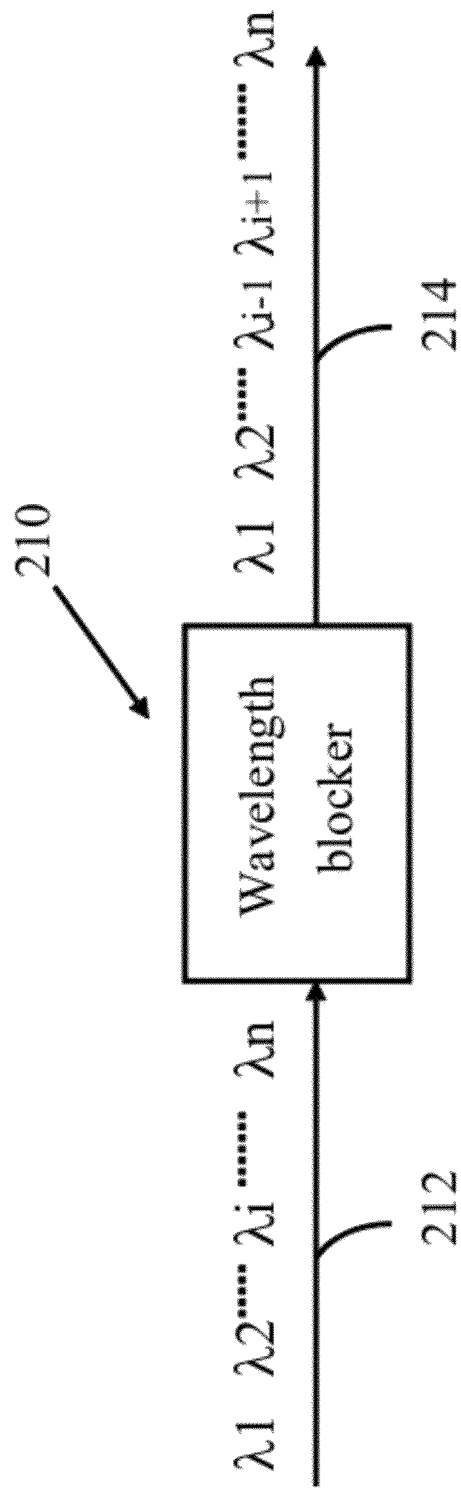
FIG. 10 is a block diagram of wavelength blocker.

FIG. 2 depicts a reconfigurable wavelength drop multiplexer 10 in which AOTF 12, depicted as 190 in FIG. 8 is connected to WB 20 depicted as 210 in FIG. 10. The input port 14 receives the input multiple wavelength signal, the dropped signal passes to port 16, and the output port 18 of AOTF 12 carries all channels including the dropped channel, which is then blocked by WB 20. All passed channels are multiplexed to output port 22.

Figure 3:
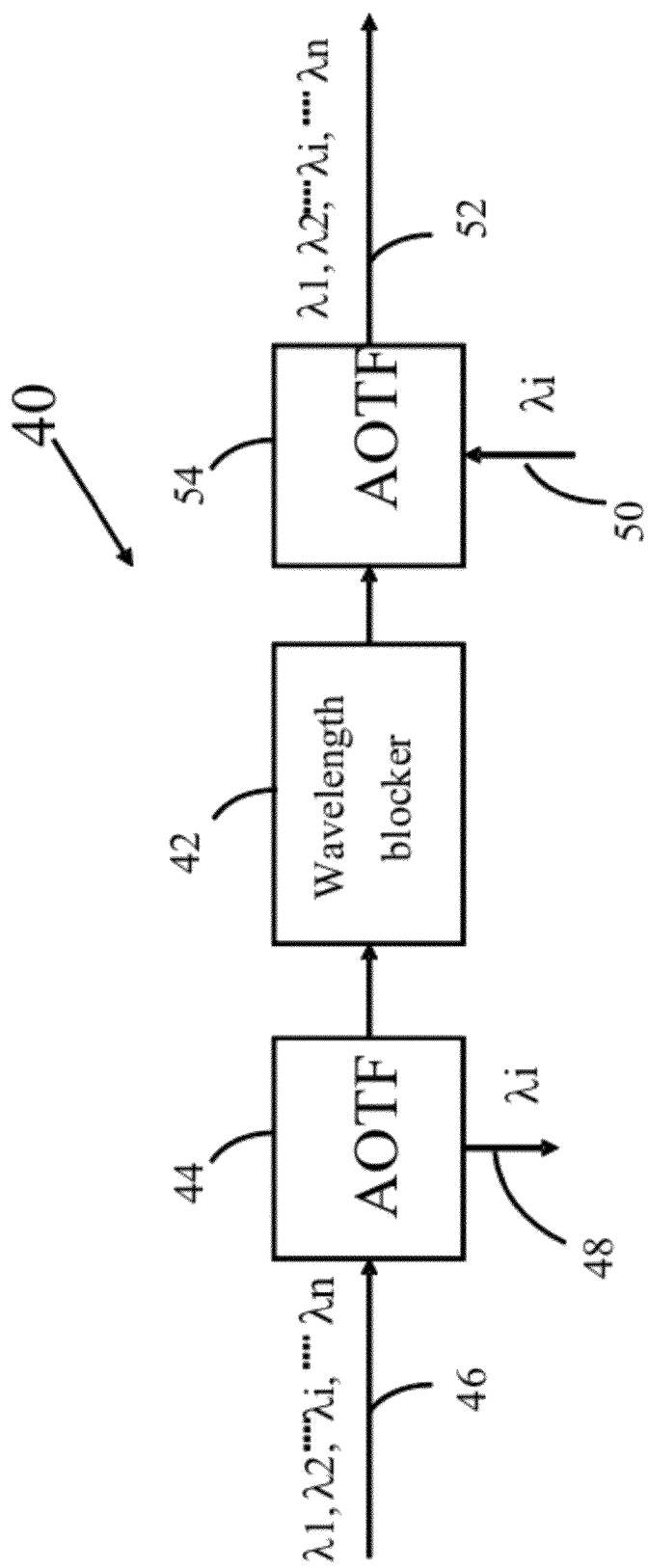
FIG. 3 is a block diagram of a reconfigurable optical add/drop multiplexer (ROADM) with one drop-port and one add-port.
Figure 9:
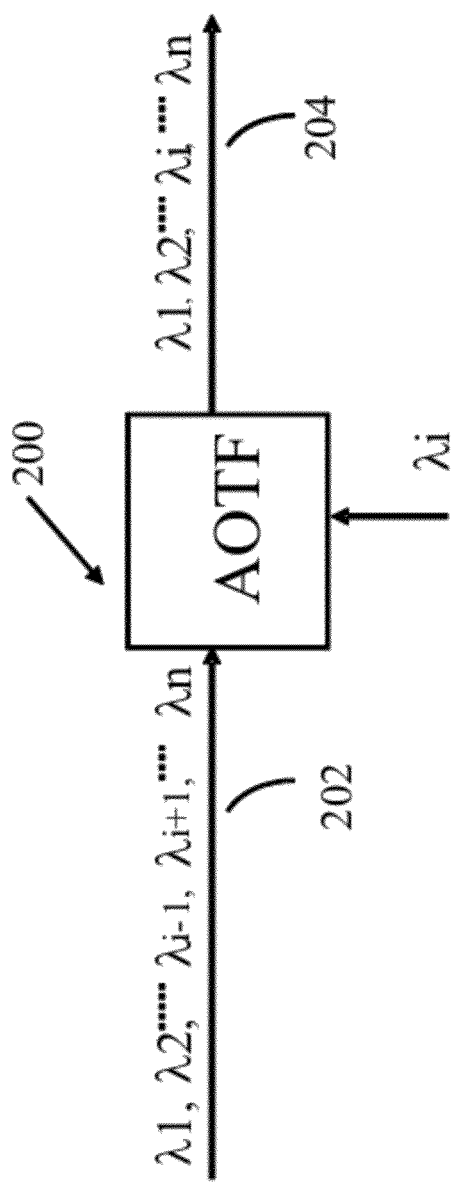
FIG. 9 shows a multi-wavelength signal input to a reconfigurable optical "add" multiplexer, the add wavelength and the output wavelengths.

FIG. 3 shows a 4-port reconfigurable add/drop multiplexer (ROADM) made by connecting the drop multiplexer 10 in FIG. 2 with the add multiplexer AOTF 200 shown in FIG. 9. Input port 46 receives the initial multiple wavelength signal, and drops the designated channel to port 48 and the signal with same wavelength as the dropped signal is added to the system through port 50. All channels are multiplexed to the output port 52. In one embodiment, the coupling between the devices 44, 54 and 42 is in free space. In another embodiment, the coupling between the devices 44, 54 and 42 is through fiber fusion splicing. The ROADM 40 may include power monitoring and equalization functions for all channels.

Figure 4:
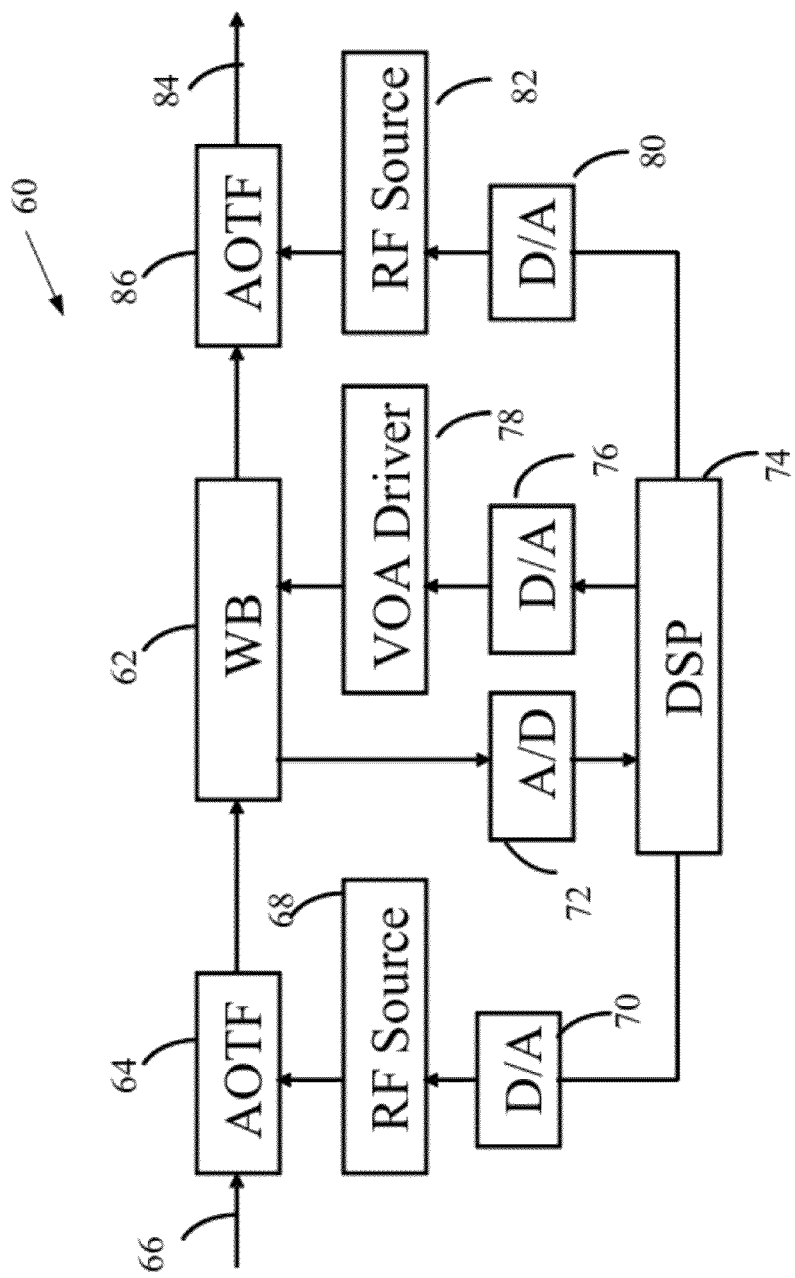
FIG. 4 is a functional block diagram illustrating the ROADM system's control loops.

FIG. 4 shows a functional block diagram of the ROADM 40 as depicted in FIG. 3. The DSP 74 receives an instruction to drop and add a particular channel, and sends a signal through digital-to-analog (D/A) device 70 and D/A device 80 to control RF sources 68 and 82 to drive the AOTF 64 and the AOTF 86. The AOTF 64 and AOTF 86 are tuned the to-be-dropped and to-be-added wavelengths, respectively. DSP 74 also sends a signal to the VOA driver 78 through D/A device 76 to block the dropped channel. The WB 62 also sends the power information back to the DSP 74 through analog-to-digital (A/D) device 72. The DSP 74 then sends one or more control signals to the VOA 78 through the D/A device 76 to balance the power for all channels transmitted through the device by adjusting the channel attenuation levels. The output channels are multiplexed to port 84.

Figure 5:
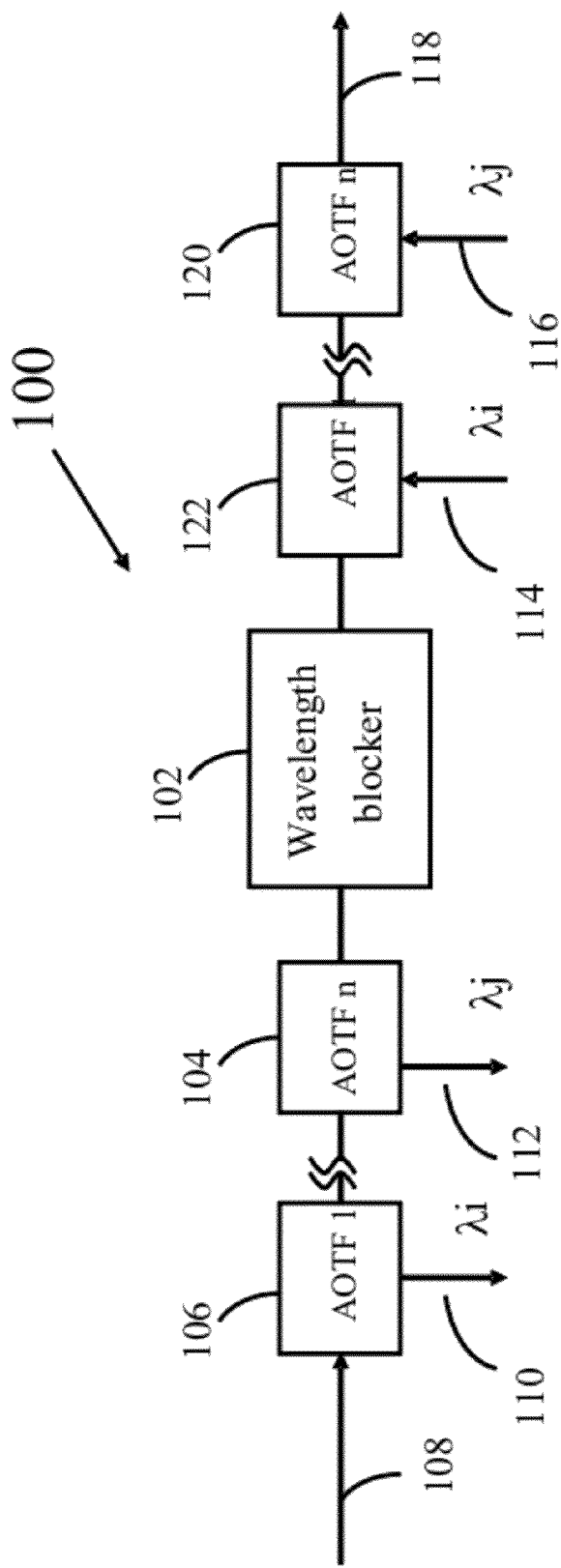
FIG. 5 is a block diagram of a scalable ROADM with more than one colorless drop-port and one colorless add-port.

Referring to FIG. 5, the ROADM depicted in FIG. 3 is scalable by adding more AOTFs 106 to drop more channels and more AOTFs 120 to add more channels. Because each AOTF can be tuned independently to any particular wavelength within a pre-defined spectral range, the drop port 110 of AOTF 106 and the drop port 112 of AOTF 104, and add port 114 of AOTF 122, and add port 116 of AOTF 120 are all colorless. Wavelength blocker 102 is also scalable in its capacity to process any number of channels by expanding its wavelength demultiplexing and multiplexing capacities. The input port 108 and output port 118 usually connect to an optical fiber pigtailed collimator in fiber telecom networks. The pigtailed fibers may be single mode in one embodiment, and may be single mode polarization maintaining (PM) fiber in another embodiment. ROADM 40 in FIG. 3 and 100 in FIG. 5 have no mechanically moving parts.

Acousto-Optical Tunable Filters

An acousto-optic tunable filter (AOTF) is a solid-state electronically tunable spectral bandpass filter. The principle behind the operation of acousto-optic filters is that the wavelength of the diffracted light is dependent on the frequency of an acoustic wave in an anisotropic or isotropic medium. Changing the frequency of the acoustic wave changes the wavelength of the diffracted optical wave. AOTFs offer continuous and agile tunability, and fast access times. Both narrow and wide bandwidth wavelength tuning are achievable using different types of AOTFs and different acousto-optical crystals.

There are two types of the acousto-optic filters, collinear and non-collinear filters. For collinear AOTFs, crystals available for the visible and infrared (IR) include lithium niobate (LiNbO3) and calcium molybdate (CaMoO4). For non-collinear AOTFs, tellurium dioxide (TeO2) is the material of choice. Presently, narrow bandwidth tuning is achievable with a non-collinear, far-off axis filter with high RF frequencies.

The AOTF has reached technological maturity, moving from the research laboratory to the commercial environment, especially due to the improved diffraction efficiency, which directly affects the optical insertion loss of a ROADM in a system. The AOTF provides high-speed capability, proven long-term reliability, and cost effectiveness for high volume manufacturing. However, an AOTF does suffer from one drawback. While it is suitable for constructing a reconfigurable add multiplexer, an AOTF alone cannot be used to build a reconfigurable drop multiplexer because the zeroth order of the diffracted light contains all wavelengths, including the diffracted (dropped) wavelength.

Figures 1, 6:
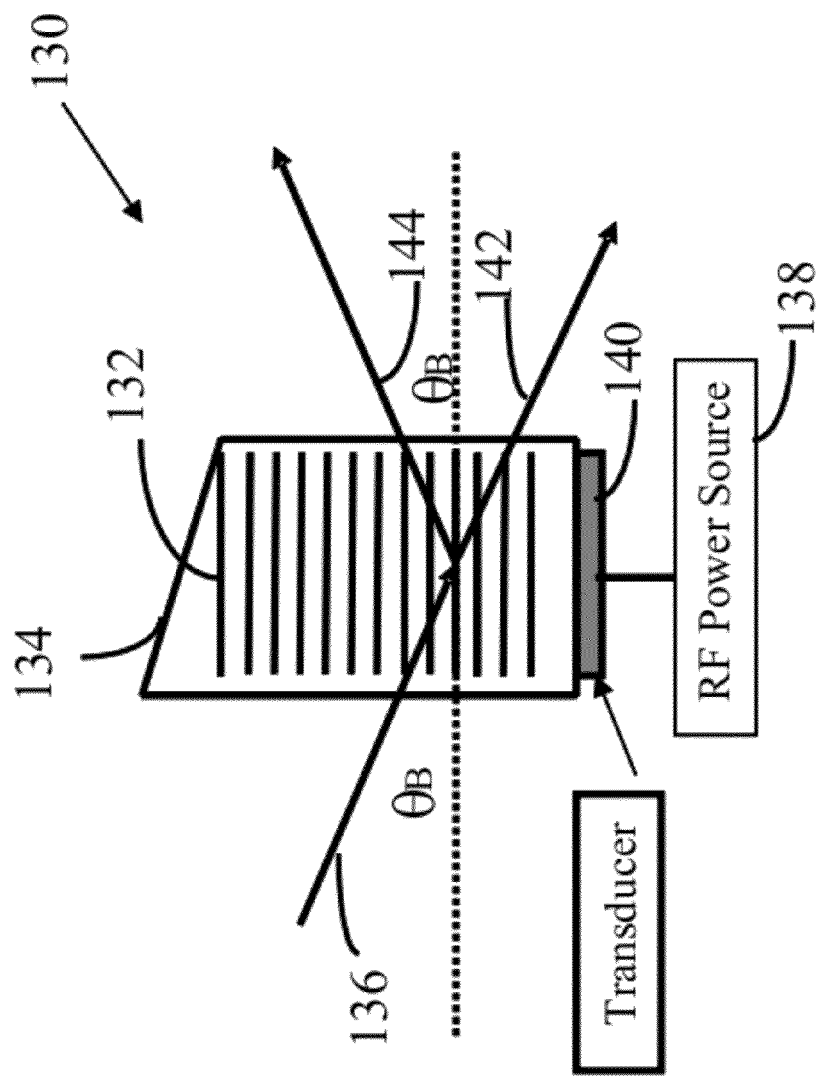
Figures 2, 6:
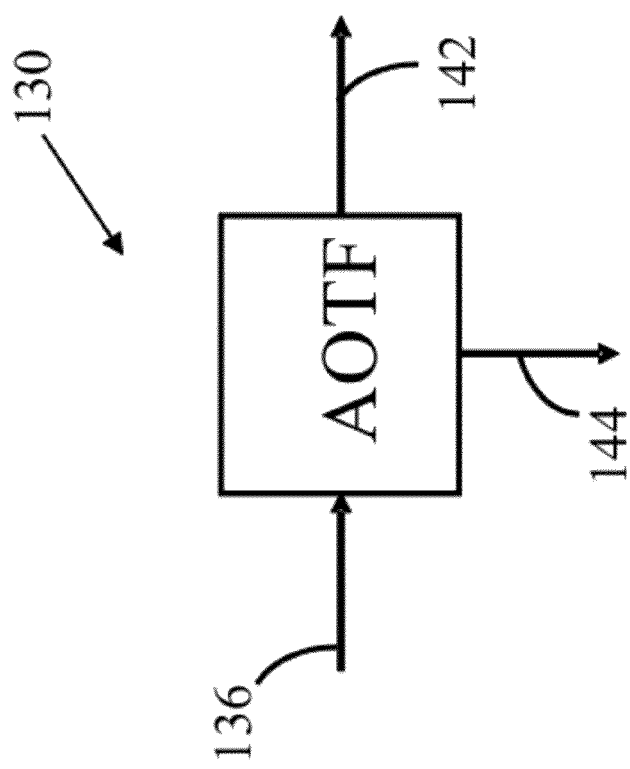

FIG. 6-1 shows a simple form of an AOTF, which includes an acousto-optic crystal 134, a transducer 140 bonded on one side, and an RF power source 138 that drives the transducer. Acoustic-optical crystal 134 diffracts input collimated light ray 136, which enters the crystal at Bragg angle, $\theta_i = \theta_B$, to generate a $1^{st}$ order light ray 144 with an output angle $\theta_B$, and a $0^{th}$ order light ray 142, which propagates in the same direction as input light ray 136. Changing the RF frequency of power source 138 changes the wavelength of the light meeting the Bragg angle $\theta_B$, and therefore the wavelength of the $1^{st}$ order light ray 4. FIG. 6-2 shows a simplified diagram of the AOTF 130 shown in FIG. 6-1.

Figures 1, 7:
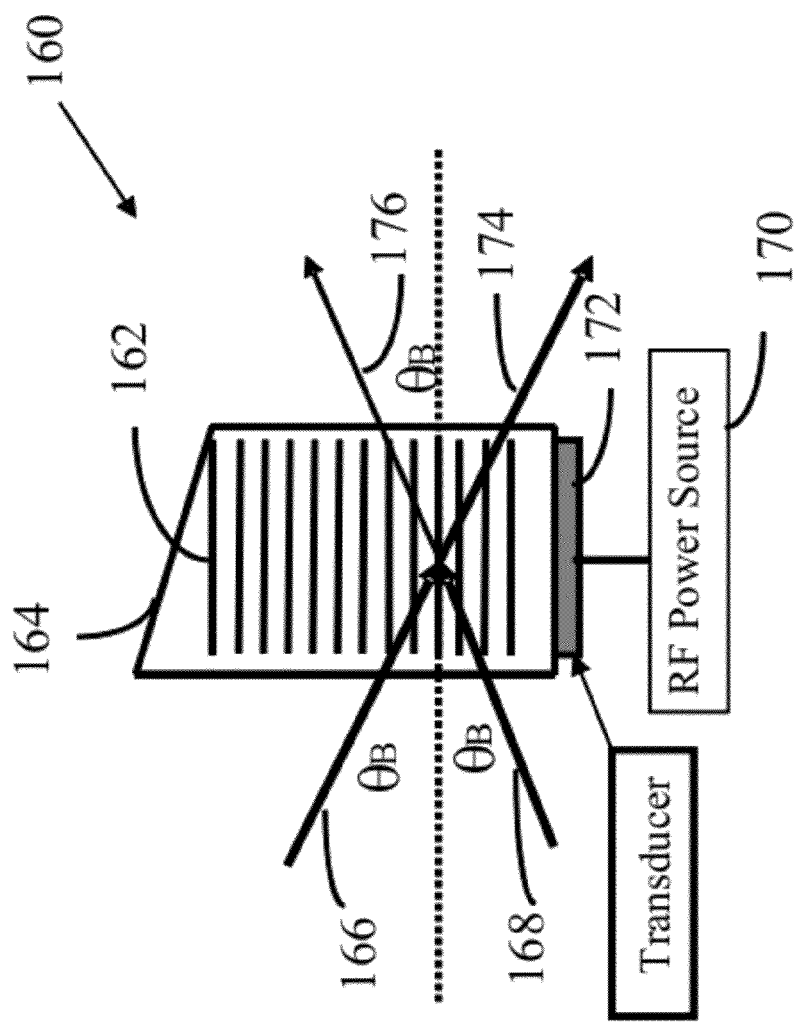
Figures 2, 7:
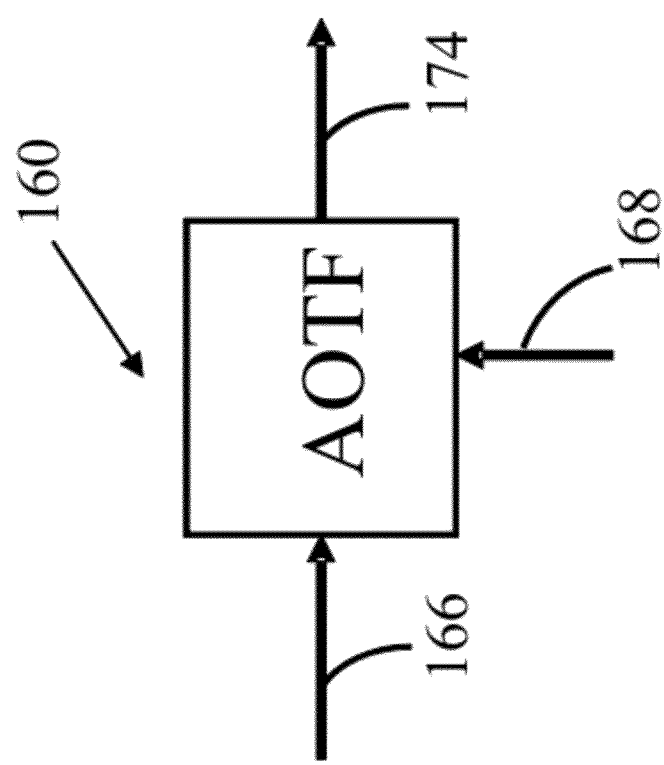

FIG. 7-1 shows an AOTF operable as a reconfigurable "add" multiplexer. The AOTF receives input ray 166, at the Bragg angle, from the upper side (opposite to direction in which the acoustic waves propagate). Input ray 166 contains all optical channels except the channel to be added. The input ray 166 passes freely through the filter, because the AOTF 160 is tuned to the channel to be added instead of input ray 166. In addition, the AOTF 160 receives input light ray 168, as the added channel, at the Bragg angle from the lower side (along the direction in which the acoustic waves propagate) and diffracts ray 168 into $0^{th}$ order ray 176 and $1^{st}$ order ray 174. Ray 176 is not used in this application and represents an optical loss. The separation angle between the input ray 166 and input ray 168 is $2\theta_B$. FIG. 7-2 shows a simplified diagram of an AOTF functioning as an "add" multiplexer, wherein ray 166 and ray 168 are combined to become ray 174.

FIG. 8 and FIG. 9 show the AOTF 190 and 200 used as a "drop" multiplexer and "add" multiplexer, respectively, with the initial multi-wavelength signal input. In FIG. 8, the AOTF 190 by itself is not usable as a reconfigurable "drop" multiplexer because the output 196 contains the "dropped" channel λi, though reduced in power. A device, called a wavelength blocker, must be added to block the dropped channel. On the other hand, in FIG. 9, the AOTF 200 is usable by itself to add a channel λi into the output 204, though the added channel suffers some optical power losses.

Wavelength Blockers

For a multi-wavelength input optical signal, a wavelength blocker (WB) is defined as an optical device that blocks one or more channels while passing the remaining channels. FIG. 10 shows a block diagram of a tunable wavelength blocker 210. In the figure, the device selectively blocks any one of the channels λi (i=1 to n) in the input signal 212, while the remaining channels pass through to the output 214.

Figures 1, 2, 11:
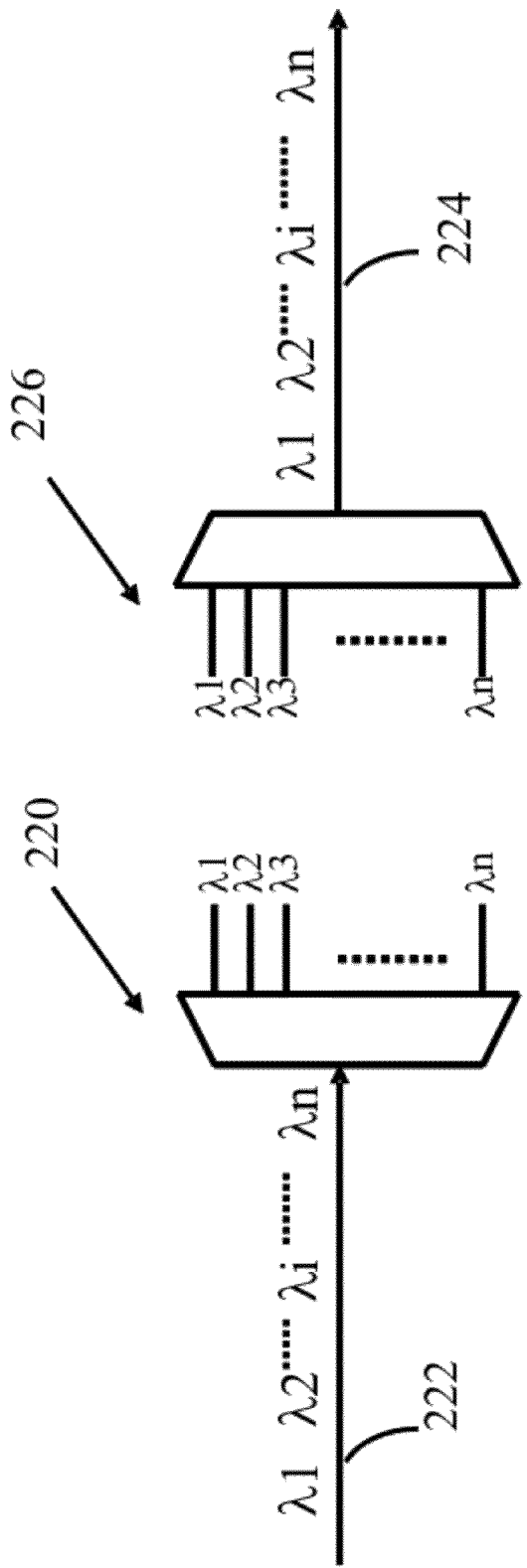

FIGS. 11-1 and 11-2 show a functional block diagram of a wavelength demultiplexer (DeMux) and a wavelength multiplexer (Mux) respectively. The DeMUX 220, in FIG. 11-1, separates a multi-channel optical signal 222 into a plurality of optical channels λi. The Mux 226, in FIG. 11-2, combines a plurality of optical channels $\lambda_i$ into a multi-channel optical signal 224.

Figure 12:
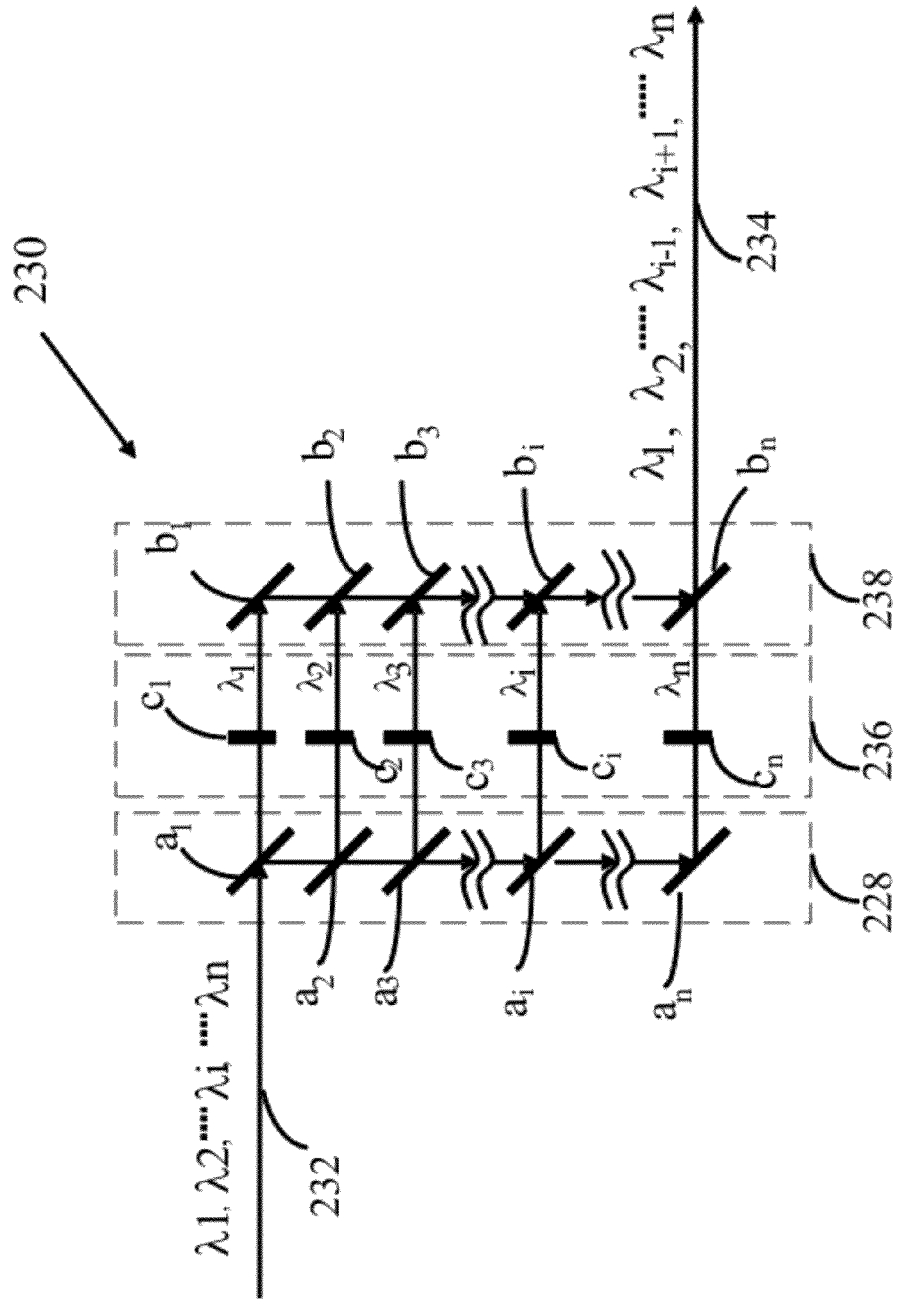
FIG. 12 is a plan view of a scalable free-space wavelength blocker comprising discrete multilayer dielectric thin film filters and a set of 1×1 optical switches.
Figure 17:
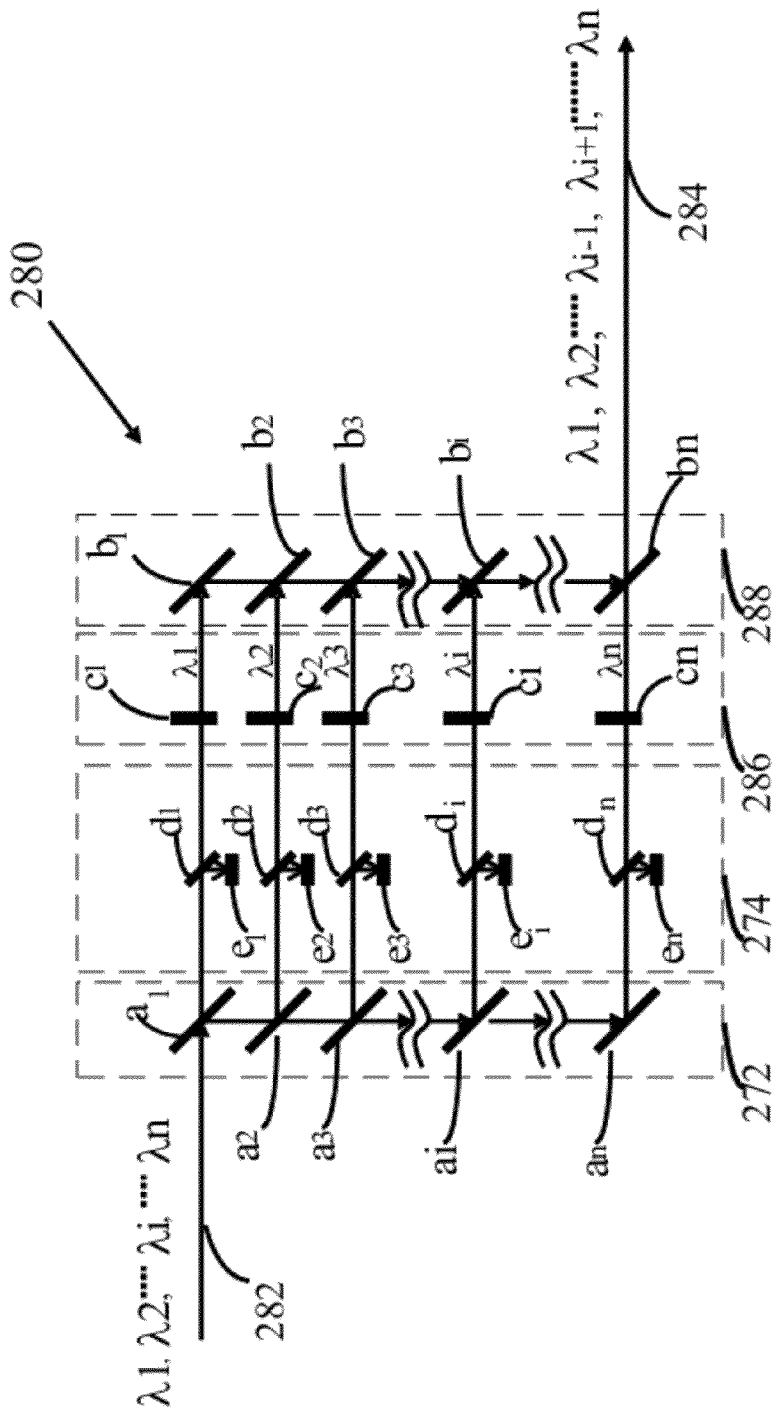
FIG. 17 is a plan view of a scalable free-space wavelength blocker/gain equalizer comprising discrete multilayer dielectric thin film filters, a set of variable optical attenuator/shuttles, and set of beam splitters and photo detectors.

FIG. 12 shows a wavelength blocker including a DeMux 228 and a Mux 238 and a set of 1×1 optical switches 236 that block one or more wavelengths in the input signal 232 from reaching the output 234. In the embodiment shown in FIG. 12, the DeMux 228 and Mux 238 include discrete multi-layer dielectric thin film filters aligned in free space. FIG. 17 shows a wavelength blocker with integrated gain equalization function by using a set of variable optical attenuator (VOA) 286 and a set of power monitoring devices 274. VOA 286 provides both power equalization and the channel blocking function. In the embodiment shown in FIG. 17, all optical parts are aligned in free space.

Free-Space WB

FIG. 12 shows a WB that includes a first set of filters 228 a1 to an, a second set of filters b1 to bn 238, and a set of 1×1 optical switches 236 c1 to cn disposed between the first and second set of filters 228, 238. The filters in each filter set 228, 238 are arranged parallel to each other and at a 45 degree angle to the input ray 232. The a1 filter in the first set of filters 228 [a1 . . . an] receives a collimated, multi-channel input signal 232, which includes wavelength channels from λ1 to λn. Each filter, after the first, a2 to an receives a portion of the input ray and passes a portion of the received ray to the next filter and to one of the switches in the set 236. Thus, filters 228 a1 to an perform a demultiplexer function, separating the channels in the input signal 232. With the channels separated, the optical switches in 236 c1 to cn operate to block one or more channels λ1 to λn. The unblocked channels pass through to the second filter set 238 b1 to bn, which collects the channels together, performing a multiplexer function, to provide the output ray 234. This free space configuration has the advantage of a small footprint, but the disadvantage that manufacturing is more difficult, especially when the number of channels is large.

Dielectric Thin Film Filters (DTFF)

Figure 13:
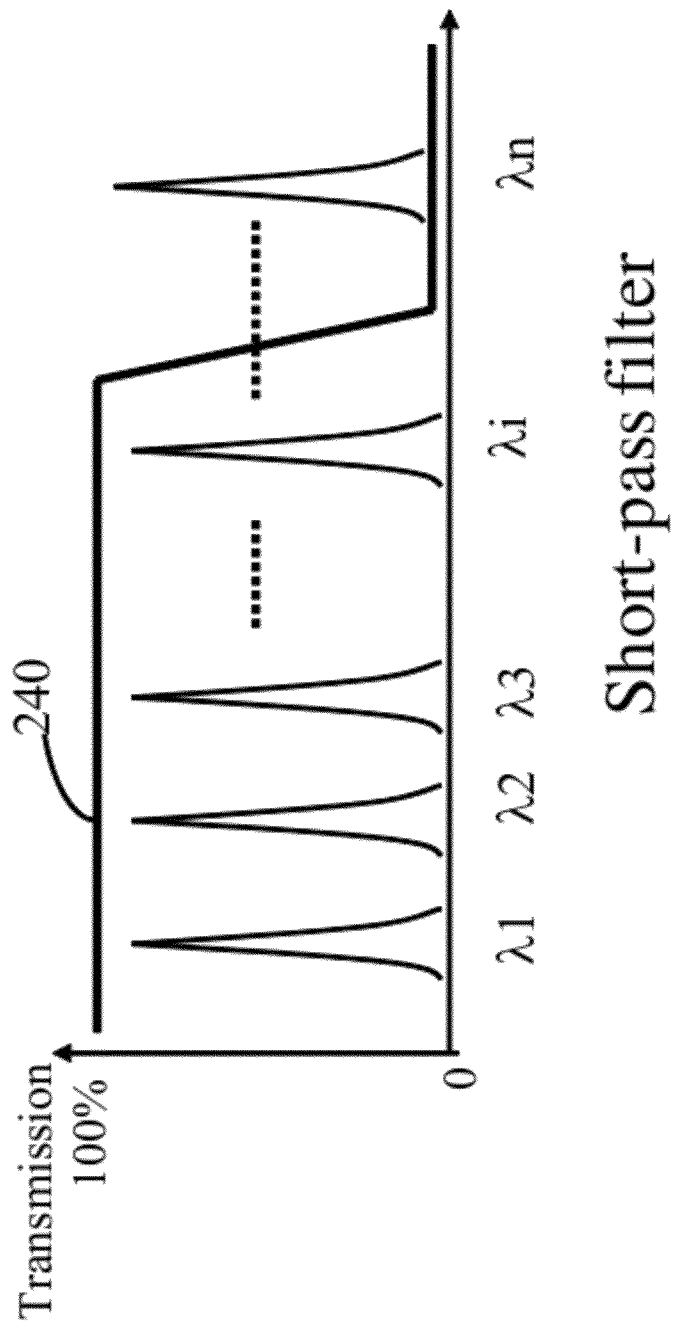
FIG. 13 shows a transmission optical spectrum curve of a short-pass optical filter.
Figure 14:
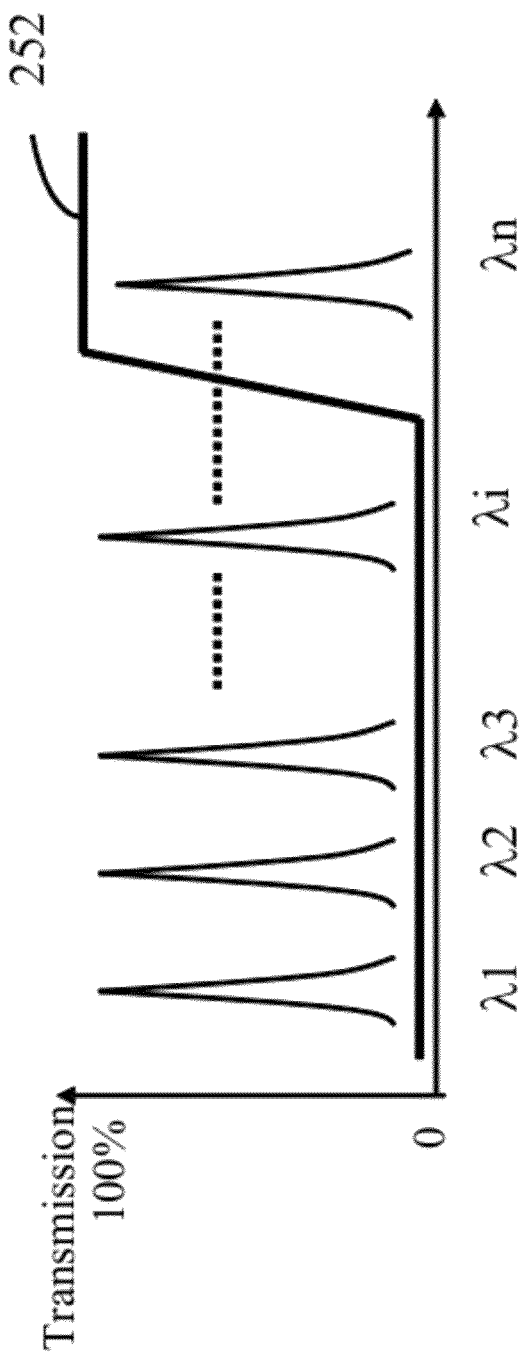
FIG. 14 shows a transmission optical spectrum curve of a long-pass optical filter.

In one implementation, the filters in the filter sets of FIG. 12 are multilayer dielectric thin film filters. Characteristics of such filters are discussed below. FIG. 13 shows a transmission curve 240 of a so-called short-pass filter. A short-pass filter for $\lambda i$ is a filter that passes any channel with wavelength equal to and smaller than $\lambda i$ but reflects channels with wavelengths greater than $\lambda i$. FIG. 14 shows a transmission curve 252 of a so-called long-pass filter. A long-pass filter for $\lambda i$ is a filter that passes any channel with wavelength greater than $\lambda i$, but reflects channels with wavelengths equal to or smaller than $\lambda i$. In a particular application, a designer can configure short-pass and long-pass filters to pass or reflect a single channel or multiple channels. Each filter in the set has a spectral passband width that meets the passband width requirement of the multiple wavelength signal on the input port of the first filter.

Returning to FIG. 12, the optical characteristics of the filters in the filter sets of WB 230 are as follows.

Filters in set 228 a1 through an

Filter a1 is a short-pass filter for $\lambda 1$. Thus, filter a1 passes $\lambda 1$ and reflects the other wavelengths. Filters ai (i=2 to n) are long-pass filters for $\lambda i$ (i=2 to n). This means that each reflects the wavelength for its given position in the array, and passes the rest of the wavelengths. For example, filter a3 reflects wavelength $\lambda 3$ and passes wavelengths $\lambda 4$ and above. The last filter an only performs a reflection.

Filters in set 238 b1 through bn

Filter b1 only performs a reflection. Filters bi (i=2 to n) are short-pass filters for $\lambda_{i-1}$ (i=2 to n), thereby reflecting the wavelength corresponding to its position in the array and passing the rest of the wavelengths. Filter bn is a long pass filter for $\lambda n$.

Figure 15:
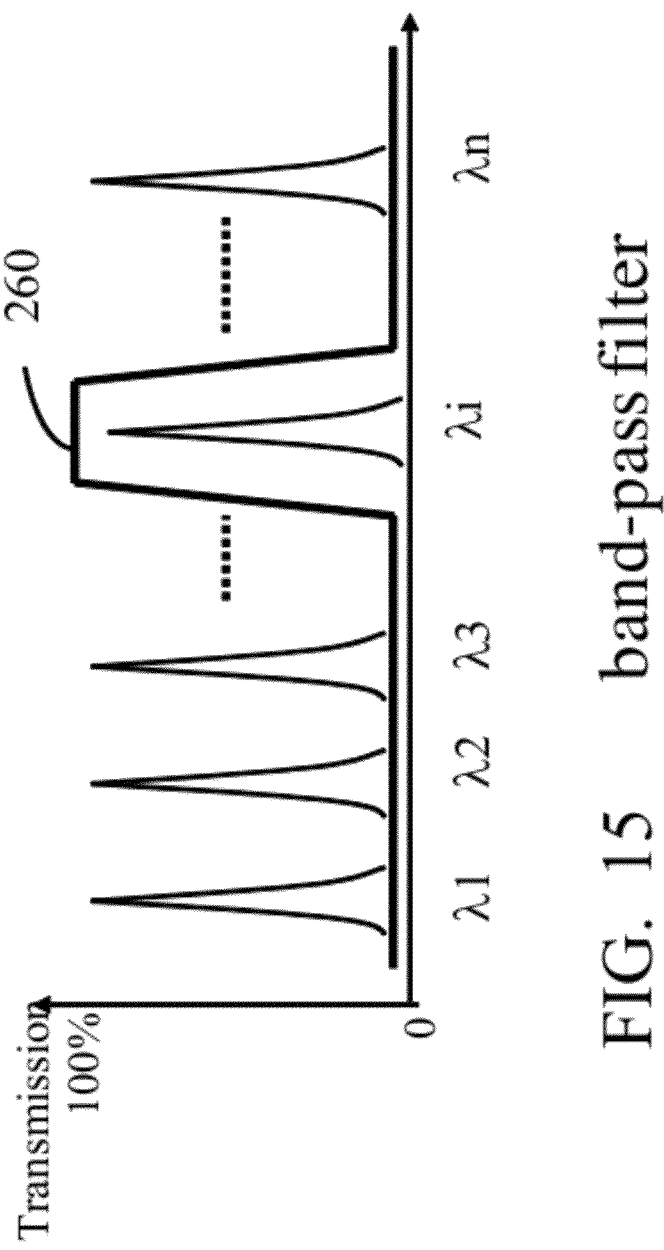
FIG. 15 shows a transmission optical spectrum curve of a band-pass optical filter.
Figure 16:
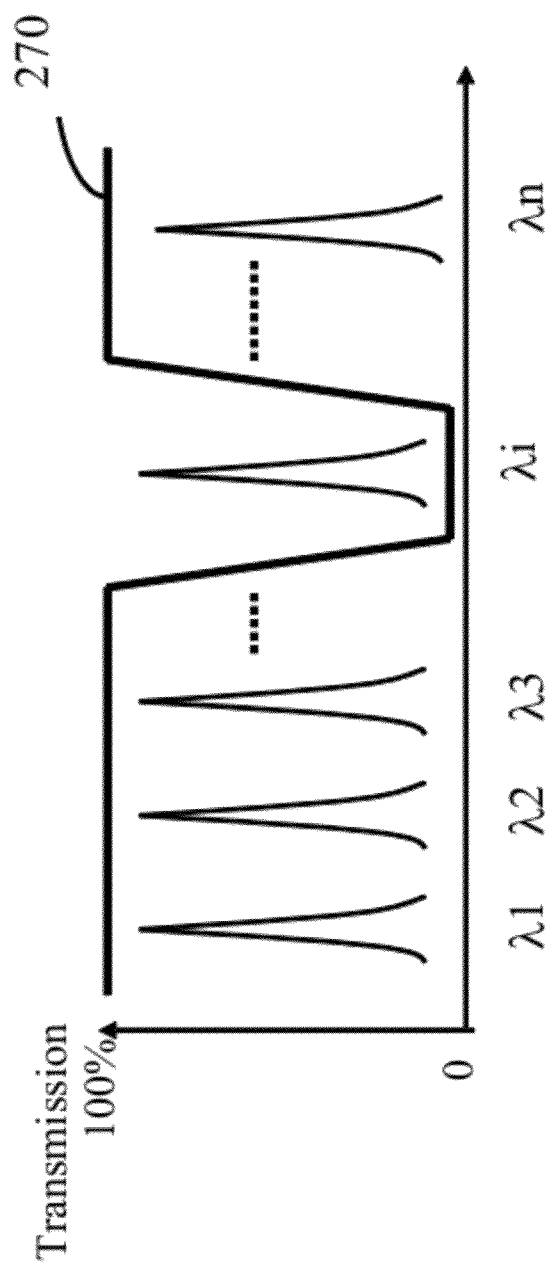
FIG. 16 shows a transmission optical spectrum curve of a band-reject optical filter.

FIG. 15 and FIG. 16 show the transmission curves 260 and 270 for the band-pass and band-reject thin film filters respectively. A person of skill in the art can construct a WB device 230 with these filters.

FIG. 17 depicts WB 280 with integrated channel monitoring and power equalization functions for all channels. The wavelength blocker 280 in FIG. 17 includes a first set 272 of filters a1 through an, a second set 288 of filters b1 through bn, a set of variable optical attenuators (VOA) 286 c1 through cn, a set 274 of beam splitters d1 through dn and photo detectors e1 through en. In the embodiment shown in FIG. 17, the DeMUX 272 and the Mux 288 include DTFF in free space. The thin film filters in WB 280 have the same characteristic as in WB 230. A VOA 286 ci blocks a channel by attenuating its optical power to a very low level. For example, a channel is considered to be blocked in most applications if the signal level is less than −50 dB. The variable optical attenuators (VOA) 286 ci (i=1 to n) in FIG. 17 replace the optical switches in WB 230 of FIG. 12. The set of beam splitters 274 di (i=1 to n) is disposed between the filters 272 ai and VOAs 286 ci (i=1 to n) and each has reflection ratio of about 1% to 5%. The beam splitters 274 are aligned approximately parallel to the filters 272 ai (i=1 to n), and the photo detectors 274 ei (i=1 to n) are disposed to tap the optical signals of the beam splitters 274 di (i=1 to n). Using the tapped signals, the photodetectors ei monitor the channel power and help control the VOAs to balance the unblocked channels using a feedback control loop, as shown in FIG. 4.

The WB 230 shown in FIG. 12 and the WB 280 shown in FIG. 17 are easily implemented for small numbers of channels (i.e., the total number of channels is less than or equal to eight). If the number of channels is greater than eight (some standard channel counts are 4, 8, 16, 32, and 64, etc. in an optical telecom system), the accumulated insertion loss (reflections and transmissions) for all channels in such configurations is very high. One method for reducing the insertion loss of a wavelength blocker with a high number of channels is to use long-pass and/or short-pass thin film filters to separate the signals into a cluster of channels with each cluster containing 4 or 8 channels.

Figure 18:
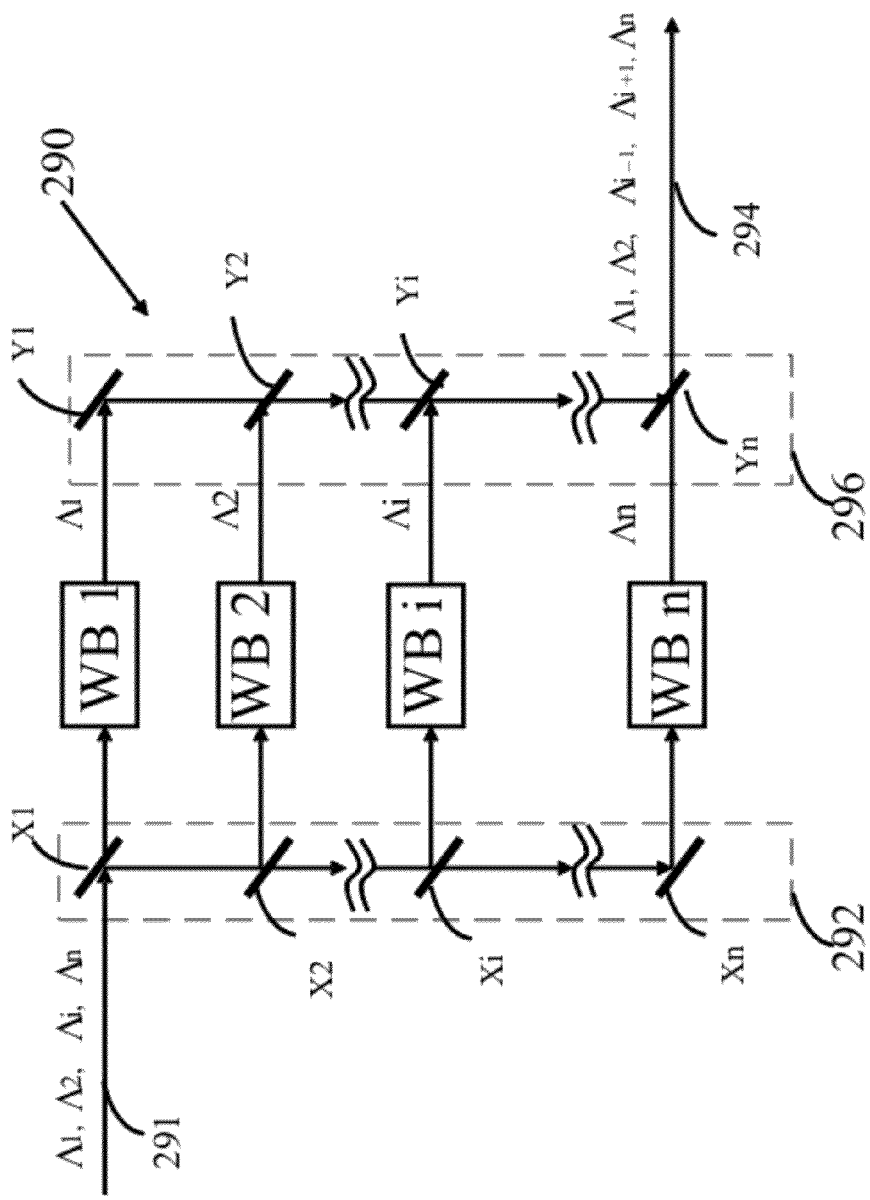
FIG. 18 is a block diagram of a scalable free-space wavelength blocker & channel equalizer with band-pass thin film filters.

FIG. 18 illustrates such a system 290 for a large number of channels. All filters 292 Xi and 296 Yi (i=1 to n) are aligned parallel to each other. Filters Xi 292 and Yi 296 (i=1 to n) have the same optical characteristic as filters ai and bi (i=1 to n) in WB 230 as depicted in FIG. 15 except Xi 292 and Yi 296 filters pass or reflect a cluster of wavelengths instead of a single channel. The collimated ray 291 with wavelength cluster Ai (i=1 to n) is sent at 45 degree to first filter X1. Each channel cluster is processed by WB 230 in FIG. 12, or WB 280 in FIG. 17.

WB Non-Freespace

The main drawback of the free space systems 230, 280 and 290 is the difficulty in precisely aligning each filter at a 45 degree angle to the input signal to minimize the system optical loss, especially for large channel counts. An alternative way to construct system 230, 280 and 290 is to use fiber pigtailed, thin film-filter based optical devices, with the coupling between the devices being through fiber fusion splicing. Furthermore, fiber pigtailed devices facilitate the functions of channel power monitoring and channel balancing. Before describing such a system, it is helpful to describe fiber pigtailed optical devices commonly used in optical telecommunication networks.

Pigtailed Optical Devices

Preferably, the fiber pigtailed optical devices described herein use single mode optical fibers. FIG. 19-1 is the schematic diagram of a 3-port fiber pigtailed device 300 with input port 304, throughput port 302, and reflection port 306. Preferably, a bandpass filter 260, as shown in FIG. 15, is used to construct the wavelength demultiplexer 220 (FIG. 11-1) and the multiplexer 226 (FIG. 11-2), though long pass filters 252 and short pass filters 240 can be used as well. The device 300, with the bandpass filter for wavelength $\lambda i$, is operative to pass channel $\lambda i$ from the input port 304 to the output port 302, and to reflect all other channels to reflection port 306.

FIG. 19-2 shows a 3-port bandpass device 320 with two input ports and one throughput port. Channel $\lambda i$ uses input port 324, and the other channels use input port 322. The channels from both input ports are multiplexed to throughput port 328.

FIG. 19-3 is the schematic diagram of a 2-port fiber pigtailed VOA device 340 with one input port 344 and one throughput port 342. The device 340 functions as a variable optical attenuator, or a switch (VOA can be used as optical switch if attenuation is more than 50 dB for most applications).

FIG. 19-4 is the schematic diagram of a 3-port fiber pigtailed tap device 350. The function of device 350 is to tap about 1%~5% of the optical power of a channel from input port 354 to photo detector 358 while passing the majority of signal to port 352.

Figure 20:
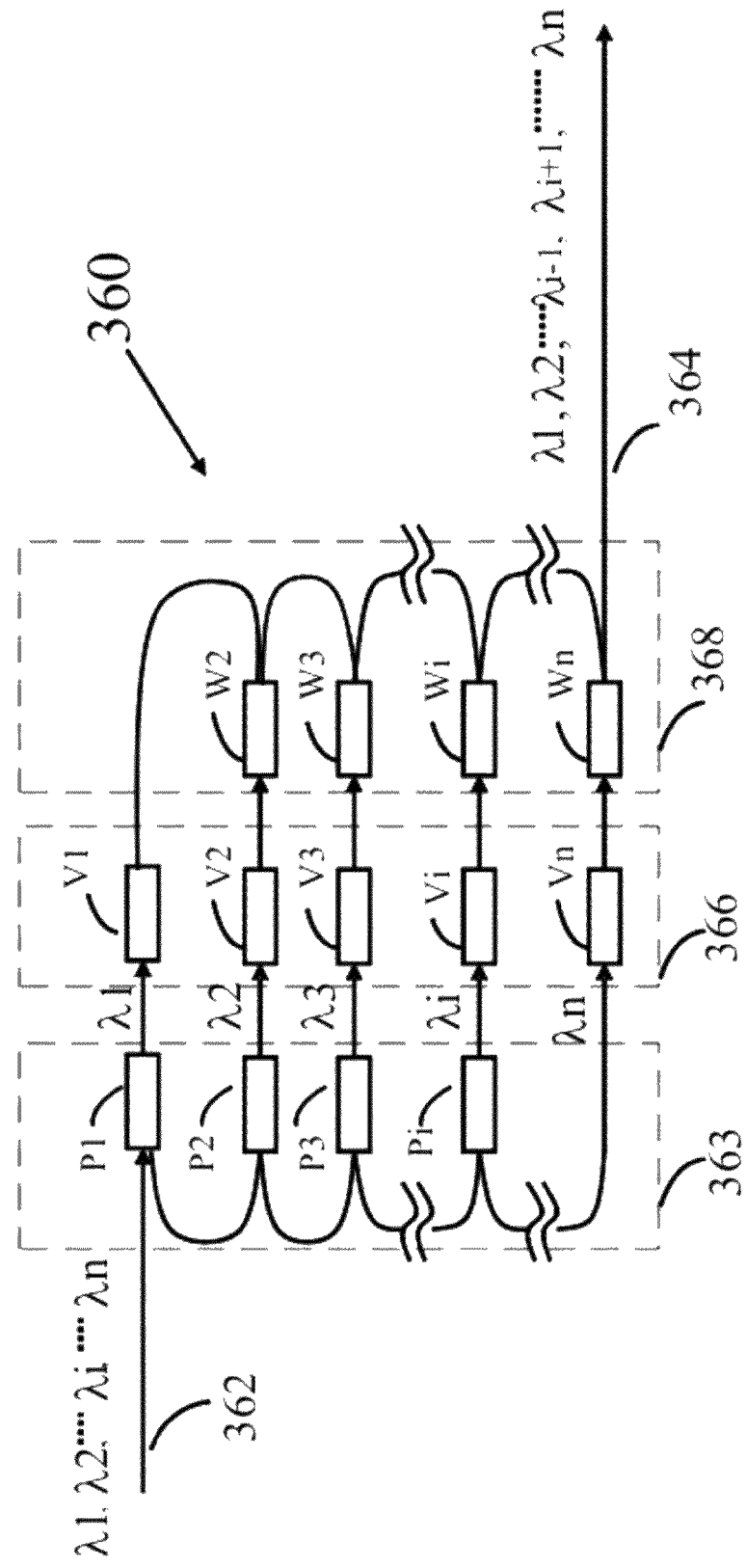
FIG. 20 is a schematic diagram of a wavelength blocker with pigtailed optical devices.

FIG. 20 shows a waveblocking device 360 that includes fiber pigtailed devices connected by fiber fusion splicing. The device includes demultiplexer devices 363 Pi (i=1 to n), VOA devices 366 Vi (i=1 to n) and multiplexer devices 368 Wi (i=2 to n). In WB 360, the input port 362 carries the initial signal and all processed signals are multiplexed to output port 364. As can be seen, there is no optical alignment issue in building such a WB, and all the devices are low cost and commercially available. The main disadvantage is the increased size of the waveblocker device, because the optical fiber bending radius must be larger than 20 mm to minimize the optical bending loss.

WBs With Power Monitoring And Power Equalization

Figure 21:
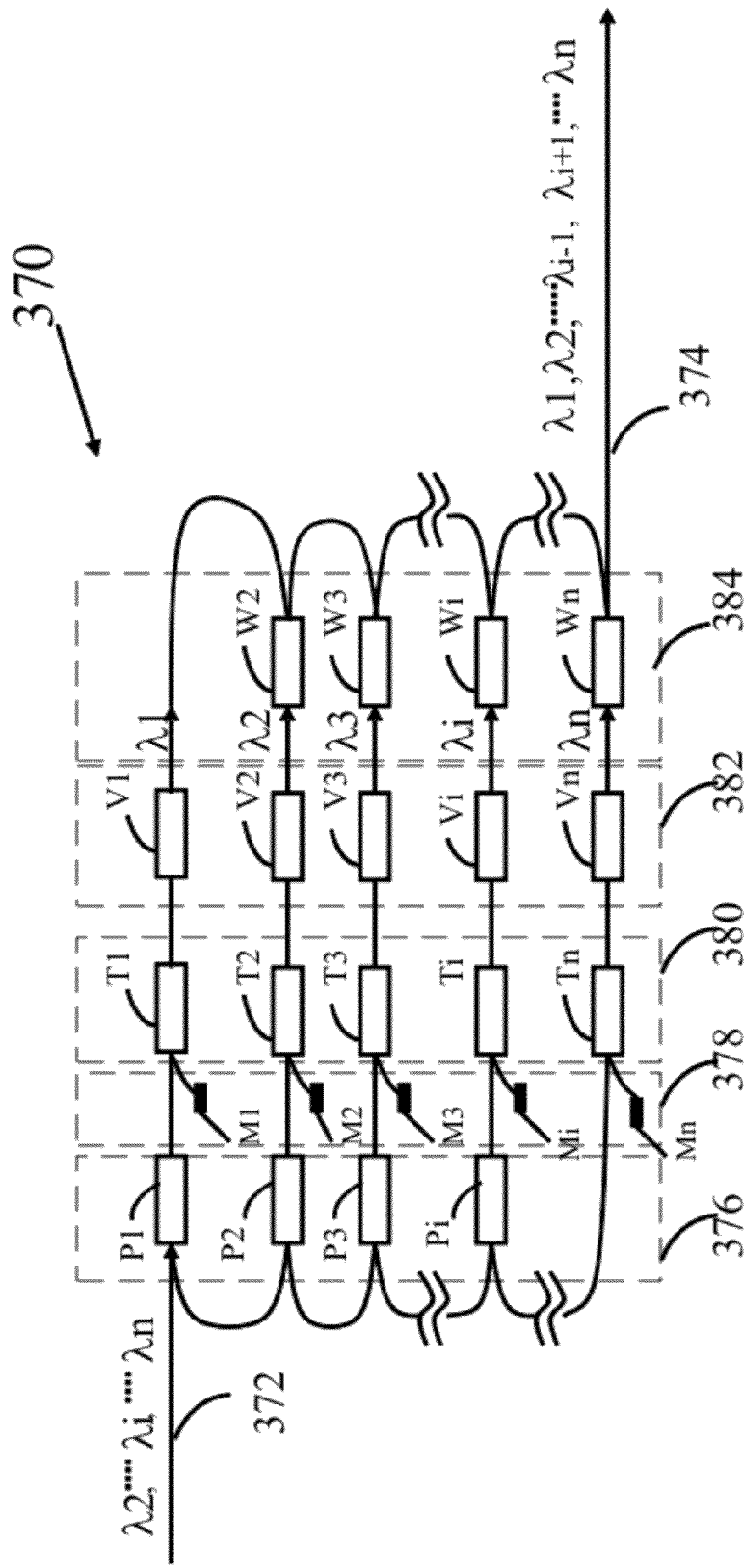
FIG. 21 is a schematic diagram of a wavelength blocker & channel equalizer with pigtailed optical devices.

FIG. 21 is a schematic diagram for waveblocker device 370 with power monitoring and power equalization functionality. The device 370 includes demultiplexer devices 376 Pi (i=1 to n), VOA devices 382 Vi (i=1 to n), multiplexer devices 384 Wi (i=2 to n), tap devices 380 Ti (i=1 to n), and photodetector devices 378 Mi (i=1 to n). The tap devices 380 are inserted between devices 376 Pi and devices 382 Vi. The photo detectors 378 Mi connect to Ti set 380 to detect the optical power for all channels. This information is fed back to a digital signal processor (DSP 74 in FIG. 4) that sends control signals to Vi devices 382 to balance the power for all channels, as depicted in FIG. 4. In WB 370, the input port 372 carries the initial signal and all processed signals are multiplexed to output port 374. In the preferred embodiment, the coupling between the Mi devices 378 and Ti devices 380 is through fiber fusion splicing, as Mi devices 378 are normally fiber pigtailed optical devices.

Although the present invention has been described in considerable detail with reference to certain preferred versions thereof, other versions are possible. For example, in one embodiment, the facets of each crystal in an acousto-optical filter are coated with multiple anti-reflection layers of a dielectric thin film to reduce the optical reflection loss and overall insertion losses. Therefore, the spirit and scope of the appended claims should not be limited to the description of the preferred versions contained herein.

What is claimed is:

1. An optical multiplexer comprising:
a first acousto-optical tunable filter that receives an input multiple wavelength signal on an input port and transmits said signal to an output port, said filter being tunable to transmit a selected one of the wavelengths in the multiple wavelength signal to a drop port;
a wavelength blocker having an input port connected to the output port of the acousto-optical tunable filter to receive the multiple wavelength signal, said wavelength blocker being operable to block the selected wavelength and transmit the remaining wavelengths to an output port of the wavelength blocker; and
a second acousto-optical tunable filter having an input port that receives the remaining wavelengths, said filter having an add port and being tunable to add a wavelength present on the add port to the remaining wavelengths to form, on an output port, an output signal of the multiplexer.

2. The optical multiplexer of claim 1,
further comprising a first rf source having a first analog control signal, and a second rf source having a second analog control signal;
wherein the first acousto-optical filter is connected to the first rf source and the second acousto-optical filter is connected to the second rf source; and
wherein said first analog control signal selects the wavelength that the first filter transmits to the drop port, and said second analog control signal selects the wavelength that the second filter adds to the constituent wavelengths to form the output signal.

3. The optical multiplexer of claim 2, further comprising:
digital signal processing circuitry having a first digital control signal, a second digital control signal, and a third digital control signal; and
first, second, and third digital-to-analog converters connected to convert the first and second digital control signals, respectively, to first and second analog control signals and to convert a third digital control signal to a third analog control signal that selects a wavelength to be blocked by the wavelength blocker.

4. The optical multiplexer of claim 1, wherein said input signal is a multiple channel coarse wavelength division multiplexer (CWDM) signal with a wavelength separation of about 20 nanometers (nm) between adjacent channels.

5. The optical multiplexer of claim 1, wherein said input signal is a multiple channel dense wavelength division multiplexer (DWDM) signal with a wavelength separation of about 0.4 nm for a 50 GHz DWDM system.

6. The optical multiplexer of claim 1, wherein said input signal is a multiple channel dense wavelength division multiplexer (DWDM) signal with wavelength separation of about 0.8 nm for a 100 GHz DWDM system.

7. The optical multiplexer of claim 1, wherein said input signal is a multiple channel dense wavelength division multiplexer (DWDM) signal with wavelength separation of 1.6 nm or 3.2 nm for 200 GHz and 400 GHz WDM systems between adjacent channels.

8. The optical multiplexer of claim 1, wherein each filter includes:
an acousto-optical crystal; and
one or more transducers connected to said crystal to drive an acoustic wave in said crystal.

9. The optical multiplexer of claim 8, wherein said acoustic-optical crystal is an isotropic crystal.

10. The optical multiplexer of claim 8, wherein said acoustic-optical crystal is an anisotropic and birefringent crystal.

11. The optical multiplexer of claim 8, wherein each acousto-optical crystal has a number of facets, each facet being coated with multiple anti-reflection layers of a dielectric thin film to reduce the optical reflection loss and overall insertion losses.

12. The optical multiplexer of claim 1, wherein said wavelength blocker includes:
a first sequence of filters that separates the multiple-wavelength input signal into its constituent wavelengths;
a set of optical switches, each switch being connected to one of the filters in the first set of filters and being selectively operable to block one or more of the constituent wavelengths; and
a second sequence of filters that combines the constituent wavelengths passed by the optical switches into a wavelength blocker output signal.

13. The optical multiplexer of claim 12, wherein the first and second set of filters are multilayer dielectric thin film filters with a prescribed transmission/reflection characteristic, said filters being aligned on the same optical axis in free space, parallel to each other, and at 45 degrees to said input signal.

14. The optical multiplexer of claim 12, wherein the first and second sequence of filters include fiber pigtailed devices based on multilayer dielectric band-pass thin film filters with a prescribed transmission/reflection characteristic.

15. The optical multiplexer of claim 12, wherein the number of filters in the first and second sequence of filters is alterable to meet the number of channels in the multiple wavelength input signal by adding more filters to the sequence.

16. The optical multiplexer of claim 12, wherein each said filter has a spectral passband width that meets the passband width requirement of the multiple wavelength signal on the input port of said first filter.

17. The optical multiplexer of claim 1, wherein said wavelength blocker includes:

a first sequence of filters that separates the multiple-wavelength signal into its constituent wavelengths;
a set of variable optical attenuators, each attenuator being connected to one of the filters in the first set of filters and being selectively operable to attenuate one or more of the constituent wavelengths; and
a second sequence of filters that combines the constituent wavelengths passed by the optical switches into a wavelength blocker output signal.

18. The optical multiplexer of claim 17, wherein the first and second sequence of filters are multilayer dielectric thin film filters with a prescribed transmission/reflection characteristic.

19. The optical multiplexer of claim 17, wherein the number of filters in the first and second sequence of filters is alterable to meet the number of channels in the multiple wavelength input signal by adding more filters to the sequence.

20. The optical multiplexer of claim 17, wherein the first sequence of filters, the second sequence of filters and the set of optical attenuators each have ports that are fiber pigtailed ports.

21. The optical multiplexer of claim 17, wherein said wavelength blocker further includes:
a set of beam splitters, wherein each beam splitter is disposed at about 45 degree angle from the path of the multiple wavelength input signal and between said first sequence of filters and the set of variable optical attenuators; and
a set of photo detectors, wherein each photo detector is disposed near one of the beam splitters to receive an optical signal from the beam splitter.

22. The optical multiplexer of claim 21, wherein each beam splitter has a reflection ratio of about 1% to 5%.

23. The optical multiplexer of claim 21,
wherein each beam splitter has ports that are fiber pigtailed ports; and
wherein each photodetector has ports that are fiber pigtailed ports.

24. The optical multiplexer of claim 1,
wherein the input port and output port of the first acousto-optical tunable filter, the second acousto-optical filter, and the wavelength blocker are fiber pigtailed ports; and
wherein the ports of the first and second filters and the wavelength blocker are connected by fiber fusion splicing.

25. The optical multiplexer of claim 1, wherein said input port and said drop port of the first acousto-optical filter have a pigtailed collimator with single mode optical fibers.

26. The optical multiplexer of claim 1, wherein said add port and said output of the second acousto-optical filter have a pigtailed collimator with single mode optical fibers.

27. An optical multiplexer comprising:
a first set of acousto-optical tunable filters, each receiving a multiple wavelength signal on an input port and transmitting said signal to an output port, each said filter being tunable to transmit one of the wavelengths in the multiple wavelength signal to a drop port;
a wavelength blocker having an input port connected to the output port of the first set of acousto optical tunable filters to receive the multiple wavelength signal, said wavelength blocker being operable to block wavelengths transmitted to the output ports of the first set of filters and transmit the remaining wavelengths to its output port; and
a second set of acousto-optical tunable filters, each having an input port that receives the remaining wavelengths, each said filter having an add port and being tunable to add a wavelength present on the add port to the remaining wavelengths to form, on an output port, an output signal of the multiplexer.

28. A method of dropping and adding a wavelength to a multiple wavelength signal, the method comprising:
transmitting a selected one of the wavelengths of the multiple wavelength signal to a drop port;
separating the wavelengths of the multiple wavelength signal into its constituent wavelengths;
blocking the selected one of the constituent wavelengths and transmitting the remaining wavelengths; and
combining an added wavelength signal at an add port with the remaining wavelengths to form an output signal.

* * * * *